Figure 6:
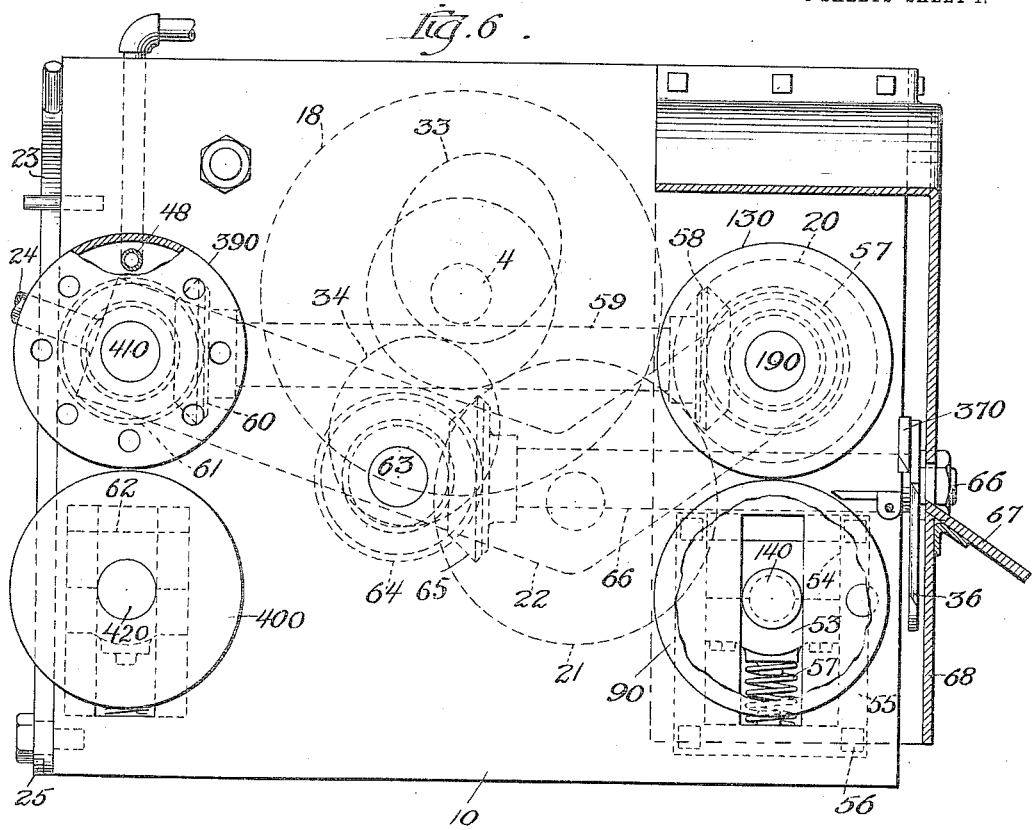

E. E. OTTO.
MACHINE FOR PRESSING AND DRYING STRIPS OF FABRIC AND CUTTING THEM INTO LENGTHS.
APPLICATION FILED FEB. 11, 1910.
1,044,687.
Patented Nov. 19, 1912.
5 SHEETS—SHEET 1.
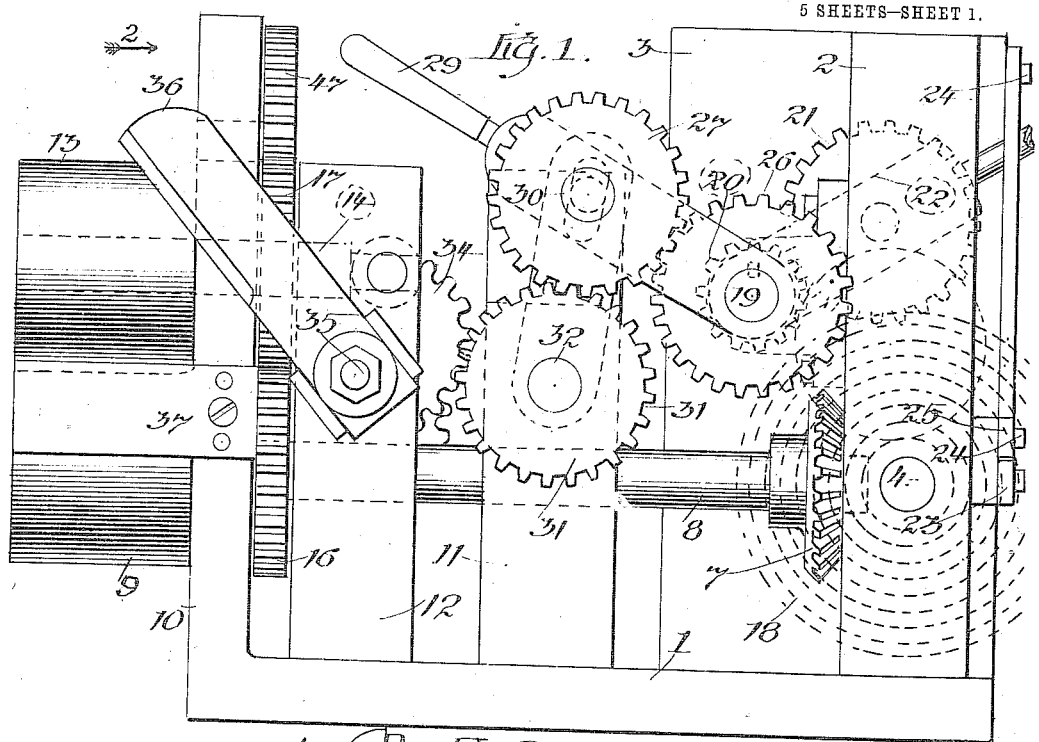
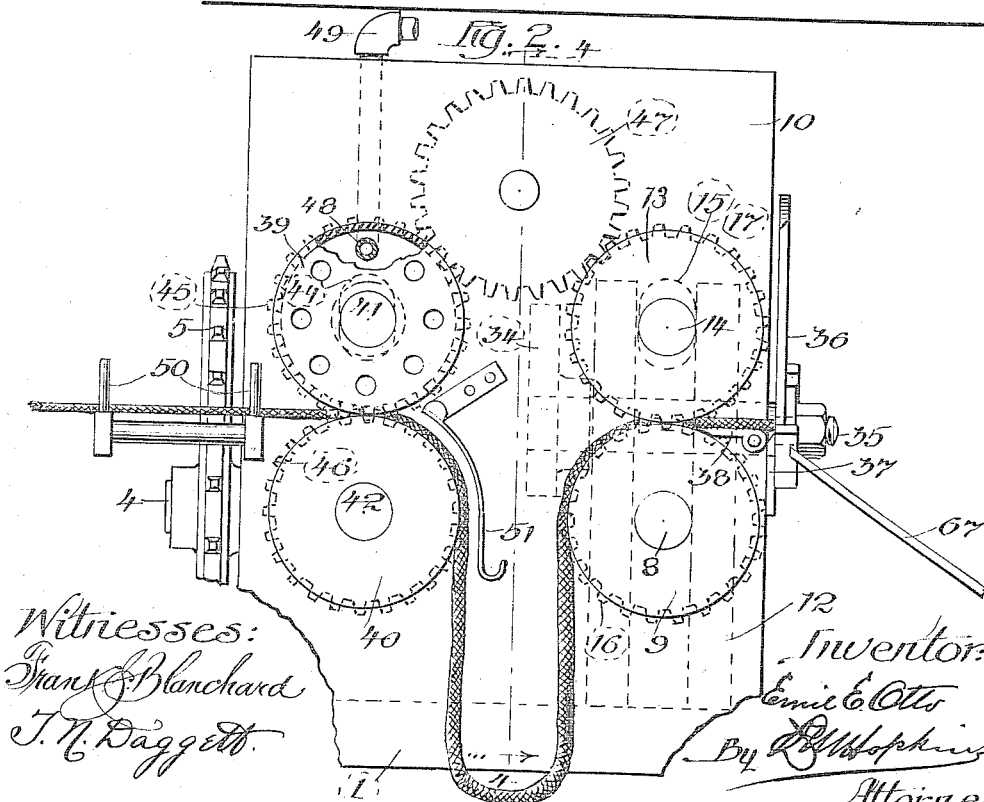
Witnesses:
Frank J. Blanchard
J. N. Daggett
Inventor:
Emil E. Otto
By D. H. Hopkins
Attorney.

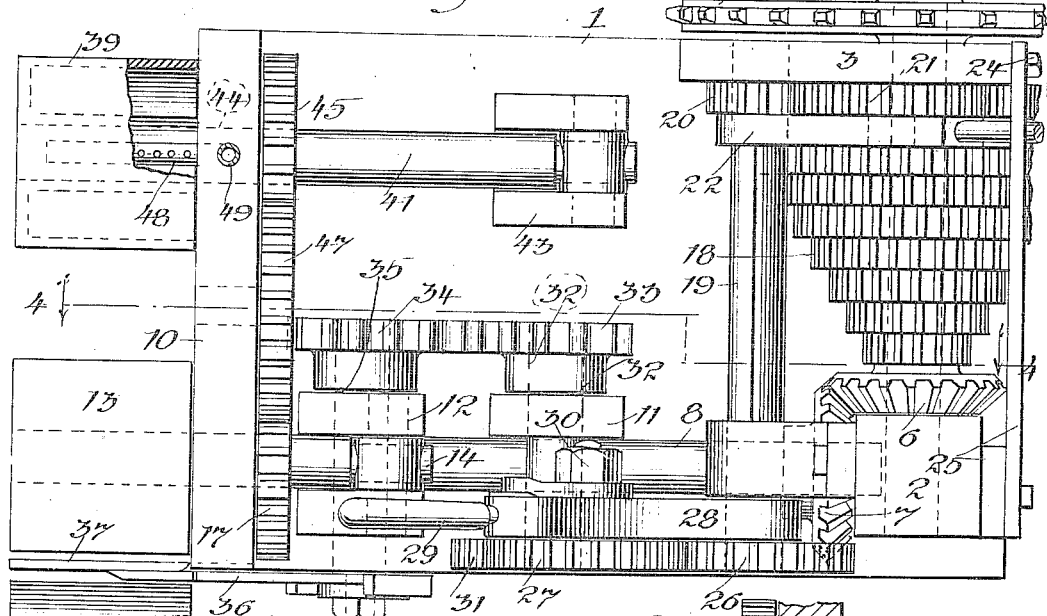

E. E. OTTO.
MACHINE FOR PRESSING AND DRYING STRIPS OF FABRIC AND CUTTING THEM INTO LENGTHS.
APPLICATION FILED FEB. 11, 1910.
1,044,687.
Patented Nov. 19, 1912.
5 SHEETS—SHEET 3.
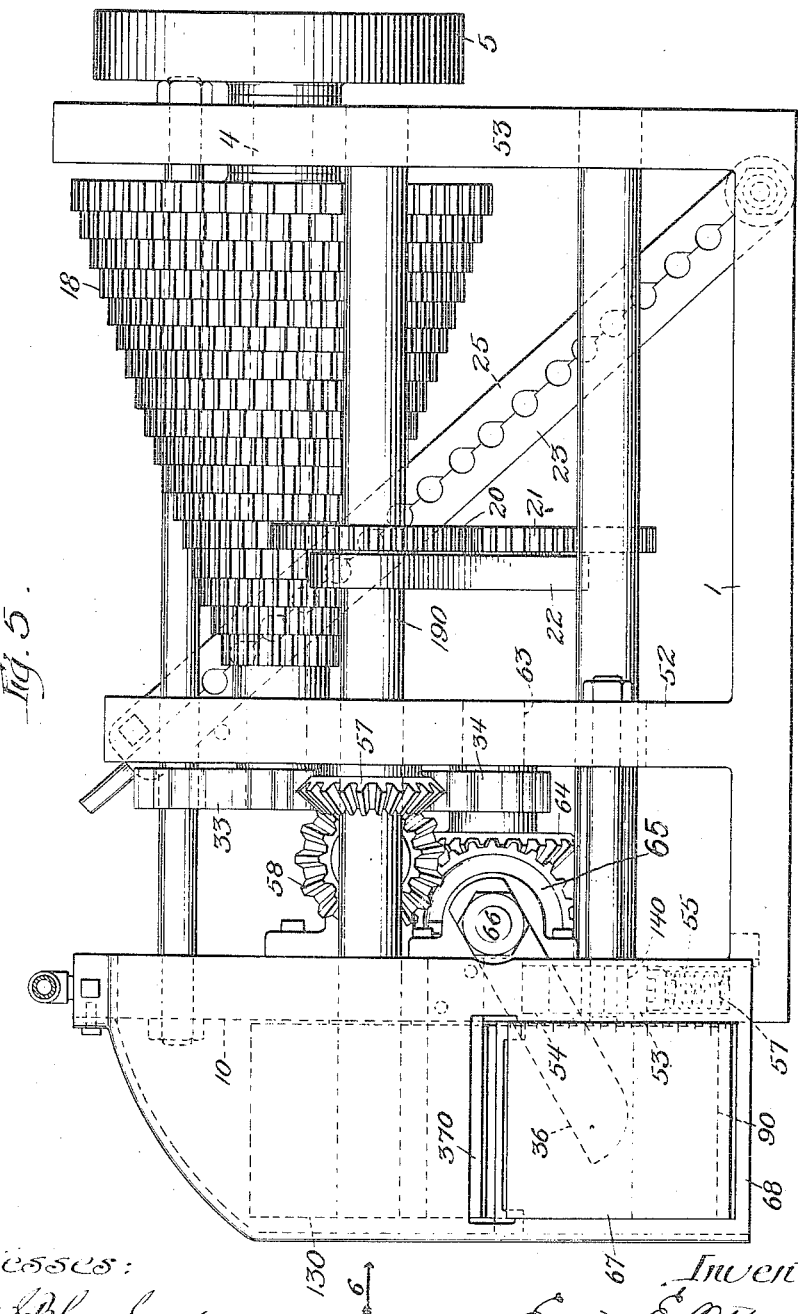

E. E. OTTO.
MACHINE FOR PRESSING AND DRYING STRIPS OF FABRIC AND CUTTING THEM INTO LENGTHS.
APPLICATION FILED FEB. 11, 1910.

1,044,687.

Patented Nov. 19, 1912.

5 SHEETS—SHEET 4.

E. E. OTTO.
MACHINE FOR PRESSING AND DRYING STRIPS OF FABRIC AND CUTTING THEM INTO LENGTHS.
APPLICATION FILED FEB. 11, 1910.

1,044,687.

Patented Nov. 19, 1912.

5 SHEETS—SHEET 5.

Witnesses:
J. N. Daggett.
Frank J. Blanchard

Inventor:
Emil E. Otto
By L. M. Hopkins
Attorney.

UNITED STATES PATENT OFFICE.

EMIL E. OTTO, OF CHICAGO, ILLINOIS, ASSIGNOR OF ONE-HALF TO ABRAHAM HERSKOVITZ, OF CHICAGO, ILLINOIS.

MACHINE FOR PRESSING AND DRYING STRIPS OF FABRIC AND CUTTING THEM INTO LENGTHS.

1,044,687.  Specification of Letters Patent.  Patented Nov. 19, 1912.

Application filed February 11, 1910. Serial No. 543,414.

*To all whom it may concern:*

Be it known that I, EMIL E. OTTO, a citizen of the United States, residing at Chicago, in the county of Cook and State of Illinois, have invented certain new and useful Improvements in Machines for Pressing and Drying Strips of Fabric and Cutting them into Lengths, of which the following is a specification.

There are many articles of manufacture made from pieces of material of uniform length which are cut from a long strip, which, in some instances, is dried and pressed before being cut all by one and the same machine. Among these articles may be mentioned parts of garments and various articles of wearing apparel, garment supporters of various kinds, incandescent mantles for gas burners, and many others made from raw materials or fabrics of different kinds. The term "fabric" as herein used is intended to comprehend a sheet made from fibrous, plastic or any other material, by weaving, knitting, molding or any other process so that the product will be a thin sheet or web, capable of being cut by a pair of relatively movable blades. The so called "strips" may be in the flat or they may be tubular, or they may be of round or other shape in cross section, and again, they may be made in the first instance in the form of strips or they may be reduced to the form of strips by cutting a wider sheet into suitable widths.

My original aim was to provide a machine for drying tubes, or tubular strips, of textile fabric and then cutting them into equal lengths for making incandescent mantles for gas burners, and hence an embodiment of the invention in a machine for this particular purpose has been selected in describing and illustrating the invention for the purposes of this application, but with the understanding that I reserve to myself the exclusive right to use the several novel features of the invention in machines for any purpose for which they may be found to be adapted.

The object of the invention, stated generally, is to provide a simple, inexpensive and efficient machine by which this work can be done expeditiously and with but little attention, the character of the machine being such that when once properly set in operation it is thereafter practically automatic.

Figure 7:
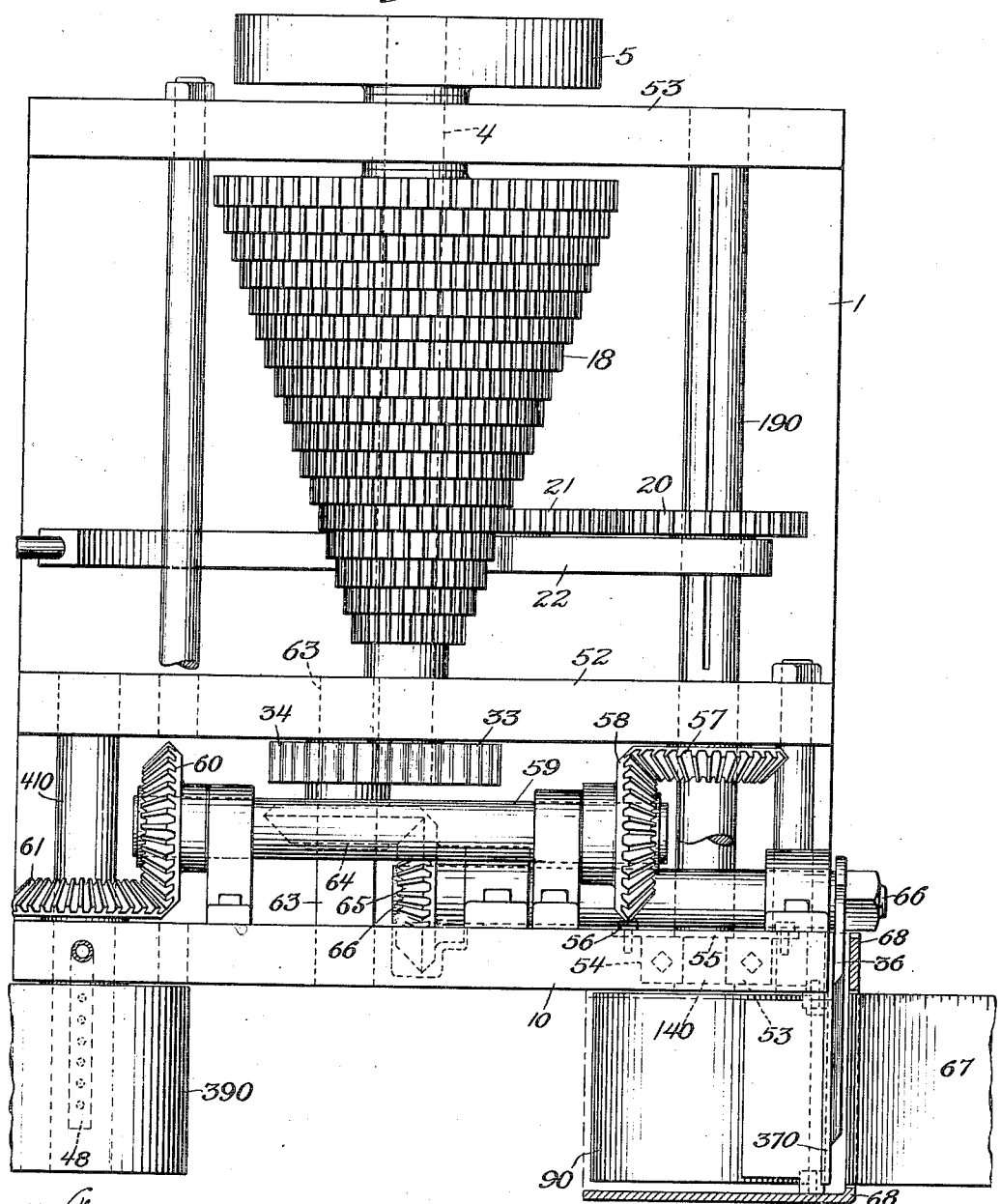

To this end the invention consists in the features of novelty that are hereinafter described with reference to the accompanying drawings which are made a part of this specification and in which:

Figure 1 is a front elevation of the machine embodying the invention. Fig. 2 is an end elevation thereof viewed in the direction of the arrow 2, Fig. 1. Fig. 3 is a plan view thereof. Fig. 4 is a vertical section thereof on the lines 4—4, Figs. 2 and 3, looking in the direction of the arrows. Fig. 5 is a front elevation of a machine of modified construction embodying the invention, this being elected as the preferred form of the invention for the purposes of this application. Fig. 6 is an end elevation thereof viewed in the direction of the arrow 6, Fig. 5 with portions of the face-plate broken away. Fig. 7 is a plan view thereof.

The machine has a base plate, 1, adapted to rest upon any suitable support and it, in turn, supports the various other parts. From the front and rear sides of the base plate, and near one end thereof, rise two posts, 2 and 3, which support or afford the journal bearings for the main shaft, 4, to the rear end of which is secured a driving pulley or gear wheel, 5. Secured to the main shaft is a beveled gear wheel, 6, which meshes with a corresponding gear wheel, 7, secured to a shaft, 8, arranged with its axis perpendicular to the axis of the main shaft, the main or driven feed roll, 9, being secured to the shaft, 8, at the outside of a vertical face plate, 10, which rises from the base plate. The shaft, 8, which may be termed the main feed shaft, is journaled in suitable bearings supported by posts, 11 and 12, rising from the base plate, and passes through an opening in the face plate, the nature of the journal bearings for the main feed shaft and the opening through the face plate through which it passes being such that the shaft is permitted to revolve freely but held against any endwise or lateral movement. The upper feed roll, 13, is secured to a shaft, 14, which is journaled in bearings supported by the post, 12, and passes through a vertically elongated opening through the face plate, 10, which opening is indicated by dotted lines at 15 in Fig. 2. The journal bearings for the shaft, 14, are so constructed and supported that the shaft may have a limited amount of lateral movement, in order that the feed roll 13, may rise and fall relatively to the feed roll 9, for the purpose of accommodating fabrics of different thicknesses which they are used to feed forward, or in the direction of the arrows in Fig. 2. At the inner side of the face plate intermeshing gear wheels, 16 and 17, are secured to the shafts, 8 and 14, respectively, so that the feed rolls revolve at the same surface speed, resulting in a positive, uniform feeding of the fabric.

Secured to the main shaft is a cone gear, 18, which is adapted to drive a counter shaft, 19, through the medium of a gear wheel, 20, which is secured to the counter shaft by a spline and groove or other means which will connect them non-rotatively, but so as to permit the gear wheel to be moved longitudinally upon the shaft, and an intervening idler, 21. The journals of the gear wheel 20 and idler, 21, are carried by a link or yoke, 22, which is loosely mounted upon the counter shaft so as to be capable of swinging about the axis thereof, so that by shifting the link or yoke upon the counter shaft the idler may be brought into engagement with any one of the steps or toothed surfaces of the cone gear, in well known manner. By this means the relative speeds of the main shaft and the counter shaft, and consequently the parts which derive their movement from the counter shaft may be regulated at will.

For the purpose of holding the idler in engagement with the cone gear a supporting bar or plate, 23, is so arranged that a stud, 24, on the link or yoke will come in contact with it and limit the movement of the axis of the idler toward the axis of the main shaft, the shape or configuration of the engaging or working side of the supporting bar being such that it will engage the stud, with whichever one of the steps of the cone gear the idler is, for the time being, in mesh. In order to hold the idler in engagement with the cone gear a swinging clamping plate or bar, 25, is so arranged that it may be moved into or out of the engagement with the stud, 24, one or both of them being provided with a series of notches which correspond in relative positions with the relative positions of the several steps of the cone gear, a latch or locking device of any suitable construction being provided for holding the clamping plate when in use.

Secured to the counter shaft, 19, is a gear wheel, 26, which meshes with an idler, 27, the journal of which is supported by a link or yoke, 28, said link or yoke being mounted upon the counter shaft so as to be capable of being moved or swung about the axis thereof, for which purpose it is provided with a handle, 29, a suitable locking device, 30, being provided for holding the link or yoke in any position in which it may be set. The idler, 27, meshes with a gear wheel, 31, which is removably secured to a shaft, 32, journaled in suitable bearings carried by the post, 11, said gear wheel, 31, being removable in order that a gear wheel of any desired diameter may be secured to the shaft, 32, whereby the relative speeds of the main shaft and the shaft, 32, and consequently of the parts which derive their movement from the shaft 32, may be varied at will, in well known manner. Secured to the shaft, 32, is an elliptical gear wheel, 33, which meshes with a corresponding elliptical gear wheel, 34, secured to a shaft, 35, journaled in bearings supported by the post, 12, and disposed with its axis perpendicular to the axes of the feed rolls and to the outer end of this shaft is secured a cutting blade, 36, arranged in operative relation to a fixed cutting blade, 37, in such position that its cutting edge and the bite of the feed rolls lie in the same plane. Furthermore the cutting blade, 36, is so arranged that its cutting edge lies throughout and moves in a plane which is perpendicular to the shaft carrying it so that in its cutting operation it moves in a plane which is transverse to the fabric as it is being fed forward. With this arrangement it will be seen that the rotation of the main shaft will cause rotation of the feed rolls and that the rotary speed of the feed rolls may be varied at will. At the same time the rotation of the main shaft will cause rotation of the shaft carrying the movable cutting blade and that the relative speeds of the main shaft and cutter shaft may be regulated at will. The speed at which the feed rolls are driven determines the speed or capacity of the machine as represented by its output, while the speed or number of operations of the movable cutting blade determines the intervals at which the fabric is cut, or, in other words, the length of each severed piece. It will also be seen that by reason of the elliptical form of the gear wheels, 33 and 34, the movement of the cutting blade will be accelerated as the elliptical gear wheels revolve during each operation, the maximum speed being reached when the major radius of the wheel, 33, is in engagement with the minor radius of the wheel, 34, and the parts are so related that this maximum will be attained when the blade, 36, arrives at its cutting position. While the above described means for imparting accelerating movement to the cutter are efficient and satisfactory, still I do not regard my invention, in its broadest aspect, as being limited thereto. As the fabric leaves the bite of the feed rolls it passes onto a supporting and guiding table, 38, which may be of any desired construction and supported by any suitable means. This table serves to support the unsevered end of the fabric after each length is cut off and guided to and over the fixed cutting blade.

Thus far I have described only the cutting mechanism and here I desire to have it understood that a machine having only this mechanism is within the scope of this part of my invention, but in addition to this cutting mechanism the machine shown in the drawing has means for drying and pressing the fabric and this mechanism is preferably used in connection with the cutting mechanism in a machine for making incandescent mantles. This drying and pressing mechanism consists of a pair of rolls, 39 and 40, non-rotatively secured to shafts, 41 and 42, respectively, which shafts pass through openings in the face plate, 10, and are journaled in a post, 43, rising from the base plate. The opening, 44, through which the shaft, 41, passes is elongated vertically, as shown partly by dotted lines in Fig. 2 and its journal bearings are so constructed and supported that the roll, 39, is capable of a slight up and down movement relatively to the roll, 40, for the purpose of accommodating fabrics of different thicknesses. The shafts, 41 and 42, carry intermeshing gear wheels, 45 and 46, respectively, and the gear wheel, 45, meshes with an idler, 47, which, in turn, meshes with the gear wheel, 17, whereby the rolls, 39 and 40, are driven in the directions indicated by the arrows. The roll, 39, is heated in any suitable manner. It is preferably hollow and may be heated by a burner, 48, arranged within the roll and supplied with gas through a pipe, 49. The fabric is guided to the bite of the rolls, 39 and 40, by guides, 50, of any desired construction, and upon leaving the bite of the rolls its course is directed by a shield, 51, secured to the face plate thence to the bite of the feed rolls and thence to the cutting blades, all of which are arranged in the order or sequence named and each in proximity to the next in sequence.

A machine constructed as above described is practical and efficient, but for reasons that are readily appreciated by skilled mechanics the construction hereinafter described and shown in Figs. 5, 6 and 7, and which is the preferred form of the invention, has several advantages which will be hereinafter pointed out.

In the machine shown in Figs. 5, 6 and 7 the main shaft, 4, is journaled at one end in a bearing supported by a post or standard, 52, and at the other end in a post or standard, 53, both of which rise from the base plate, 1, and are parallel with the face plate 10. It carries the cone gear, 18, from which movement is transmitted to the counter shaft, 190, through the medium of gear wheels, 20 and 21, which are constructed, arranged and have accessories similar to those already described. The upper feed roll, 130, is non-rotatively secured to the counter shaft, and thus becomes the driven feed roll, while the lower feed roll, 90, derives its movement from the driven feed roll by frictional contact therewith or with the strip of material which intervenes between them. The counter shaft is incapable of any lateral movement, while the shaft, 140, of the lower feed roll is mounted in a floating journal box, 53, so that the lower feed roll, 90, is capable of rising and falling relatively to the upper feed roll. This floating journal box, or other bearing, may be of any desired construction. In the drawing it is shown as being constructed in two parts or halves secured together by bolts and mounted so as to be capable of sliding vertically in guide ways resulting from a vertical groove, 54, in the face plate and a plate, 55, which is let into a counter sink in the face plate and secured thereto by bolts, 56, a coiled spring, 57, being arranged between the bottom of the box and the bottom of the groove, 54. The upper roll, 390, is positively driven from the counter shaft, 190, through the medium of suitable gearing. This gearing may consist of a beveled gear wheel, 57, carried by a shaft, 190, and meshing with a corresponding gear wheel, 58, carried by a shaft, 59, at one end thereof, the opposite end of which carries a beveled gear wheel, 60, meshing with a corresponding gear wheel, 61, secured to the shaft, 410, of the roll, 390, said shaft being mounted in bearings of such a nature that it is incapable of any lateral movement. The lower roll, 400, derives its movement by frictional contact with the roll, 390, or with the intervening strip of material which they feed forward and its shaft, 420, is mounted in a floating bearing or journal box, 62, constructed, adapted to operate, and having accessories similar to the box, 53, already described.

The elliptical gear wheel, 33, is secured directly to the main shaft, 4, and the elliptical gear wheel, 34, is secured to a shaft, 63, which is journaled at one end in the standard, 52, and at the other end in the face plate. The shaft, 63, carries a beveled gear wheel, 64, which meshes with a corresponding gearwheel, 65, non-rotatively secured to a shaft, 66, journaled in bearings carried by the face plate and to the forward end of this shaft the movable cutting blade, 36, is non-rotatively secured.

In the form of the invention shown in Figs. 1 to 4, inclusive, the movable cutting blade derives its movement through the medium of the counter shaft and the direction of rotation of the parts is such that the blade moves downward during the cutting interval, while in the form of the invention shown in Figs. 5, 6 and 7 the blade derives its movement from the main shaft, independently of the counter shaft, and the direction of rotation of the several parts is such that the blade moves upward during the cutting interval. In order to meet this latter condition the fixed or ledger blade, 370, is located above the bite of the feed rolls and with its cutting edge presented downward. An advantage of this arrangement is that the cutting operation will serve to slightly lift the severed end of the strip of material and permit it to fall back on to the upper end of an inclined chute or guide way, 67, which is preferably provided with a scale, graduated in inches, and fractions thereof, to indicate the length of the pieces into which the strip is cut. This chute also serves to hold the strip of material in proper position to permit the blade to unerringly come in contact with its under side during the cutting operation. It is supported by a face plate, preferably through the medium of a shield, 68, which completely covers and incloses the blade so as to prevent the attendant from being injured thereby.

It is the intention to so construct the machine that a plurality of strips may be cut at one and the same time, and in order that each strip may be positively gripped between the feed rolls, each of the driven rolls is made up of a plurality of separate sections mounted upon their respective shafts so as to be capable of a slight lateral movement relatively to said shafts and consequently relatively to each other. This may be done by making any suitable provision for the slight lost motion or play between the shafts and the feed roll sections.

The term "pressing roll" as used in this specification is intended to comprehend a roll of the class that is used for ultimately smoothing out the wrinkles of fabrics or the like that have been subjected to a bath of some sort, after the manner in which sadirons are used for ironing or smoothing the wrinkles out of garments, or, in other words, pressing them.

What I claim as new and desire to secure by Letters Patent is:

1. A machine of the class described, having, in combination, a pair of feed rolls, means for revolving them, a pair of cutting blades, a shaft on which one of said blades is mounted and arranged so that its cutting edge lies and moves in a plane transverse to the axis of said shaft, said axis being transverse to the axes of the feed rolls, and means for imparting rotary movement to the shaft and accelerating said movement when the blade reaches its cutting position.

2. A machine of the class described, having, in combination, a pair of feed rolls, means for revolving them, a pair of cutting blades, a shaft to which one of said blades is secured so that its cutting edge lies and moves in a plane transverse to the axis of the shaft, said axis being transverse to the axes of the feed rolls, and means for revolving said shaft continuously, said means including a pair of intermeshing elliptical gear wheels by which the movement of the cutting blade is accelerated as the blade reaches its cutting position.

3. A machine of the class described having, in combination, a shaft, an elliptical gear wheel carried by said shaft, a second elliptical gear wheel meshing therewith, a shaft to which the second elliptical gear wheel is secured, a beveled gear wheel secured to said shaft, a second beveled gear wheel meshing therewith, a shaft to which it is secured, a pair of cutting blades one of which is secured to the shaft last aforesaid so that its cutting edge lies and moves in a plane which is transverse to the axis of the shaft, a pair of feed rolls arranged with their axes transverse to the axis of the shaft carrying the cutting blade, aforesaid, and means for revolving the feed rolls and the shaft carrying the elliptical gear wheel first aforesaid.

4. A machine of the class described having, in combination, a pair of feed rolls, a pair of cutting blades one of which is fixed and has its cutting edge presented downward while the other is movable and has its cutting edge presented upward, a shaft carrying the movable cutting blade, and arranged with its axis transverse to the axes of the feed rolls, said movable blade being so arranged that its cutting edge lies and moves in a plane which is transverse to the axis of the shaft carrying it, means for revolving the shaft in a direction to carry the movable blade upward during the cutting interval, and means for revolving the feed rolls.

5. A machine of the class described having, in combination, a pair of feed rolls, a chute on to which the fabric passes after leaving the feed rolls, a pair of cutting blades one of which is fixed and has its cutting edge presented downward and the other of which has its cutting edge presented upward, a shaft carrying the cutting blade last aforesaid, means for revolving said shaft in a direction that carries the movable blade upward during the cutting interval, and means for revolving the feed rolls.

6. A machine of the class described having, in combination, a shaft, a pair of elliptical gear wheels one of which is secured to said shaft, a pair of intermeshing beveled gear wheels one of which is secured to the shaft of the second elliptical gear wheel, a shaft to which the second beveled gear wheel is secured, a pair of cutting blades one of which is movable and secured to said shaft, a pair of feed rolls, a shaft carrying one of said feed rolls, a cone gear secured to the shaft and gearing for transmitting movement from the cone gear to the aforesaid shaft carrying the feed roll.

7. A machine of the class described having, in combination, a pair of feed rolls, a pair of cutting blades one of which is movable, a shaft carrying the movable blade, a main shaft, means for transmitting movement from the main shaft to the shaft carrying the movable blade and accelerating said movement when said blade reaches its cutting position, and mechanism for transmitting movement from the main shaft to the feed rolls, said transmitting mechanism being variable for the purpose of altering the speed of the feed rolls relatively to the speed of the shaft carrying the movable blade.

8. A machine of the class described, having, in combination, a pair of feed rolls, means for revolving them, a pair of cutting blades arranged in operative relation to the feed rolls, a shaft carrying one of said blades and arranged with its axis transverse to the axes of the feed rolls, said movable blade extending transversely across the strip to be cut, a pair of drying and pressing rolls arranged in proximity to the feed rolls and with their axes parallel therewith, means for revolving the feed rolls and the drying and pressing rolls and means for heating at least one of the drying rolls.

9. A machine of the class described having, in combination, a pair of feed rolls, means for revolving them, a pair of cutting blades arranged in operative relation to the feed rolls, one of said blades being movable, means for operating the movable blade, a pair of pressing rolls located in proximity to the feed rolls, means for revolving them, means for guiding the strip of material to the pressing rolls, a shield for directing the course of said strip upon leaving the pressing rolls, a table for supporting the strip upon leaving the feed rolls and a chute onto which the strip is delivered upon leaving the feed rolls.

EMIL E. OTTO.

Witnesses:
ANDREW G. HOUSTON,
MABEL E. MADER.